United States Patent [19]
Smoker et al.

[11] Patent Number: 5,093,886
[45] Date of Patent: Mar. 3, 1992

[54] OPTICAL COMMUNICATION SYSTEM

[75] Inventors: John V. Smoker, London; Edward K. George, South Hornchurch; Roger E. Jung, London, all of England

[73] Assignee: Telephone Cables Limited, England

[21] Appl. No.: 290,359

[22] Filed: Dec. 27, 1988

Related U.S. Application Data

[63] Continuation of Ser. No. 109,237, Oct. 15, 1987, abandoned, which is a continuation of Ser. No. 786,327, Oct. 10, 1985, abandoned.

[51] Int. Cl.5 .......................... G02B 6/36; G02B 7/26
[52] U.S. Cl. .................................................. 385/135
[58] Field of Search ........................... 350/96.20, 96.21

[56] References Cited

U.S. PATENT DOCUMENTS 4,418,982 12/1983 Williams ........................... 350/96.20
4,717,231 1/1988 Dewez et al. ................... 350/96.20

Primary Examiner—William L. Sikes
Assistant Examiner—Robert E. Wise
Attorney, Agent, or Firm—Kirschstein, Ottinger, Israel & Schiffmiller

[57] ABSTRACT

In order to allow an optical cable to be accessed by spur cables at various points along its length after it has been laid, connection housings are provided at intervals along its length. A loop of the main cable is passed into each housing so that at a later date there is an excess of cable to enable connections to be made to it. Each housing contains fittings such as manifolds and organizer trays where the optical fibers are spliced and includes several access ports which are covered over until it is required to connect a spur cable to the main cable.

11 Claims, 3 Drawing Sheets

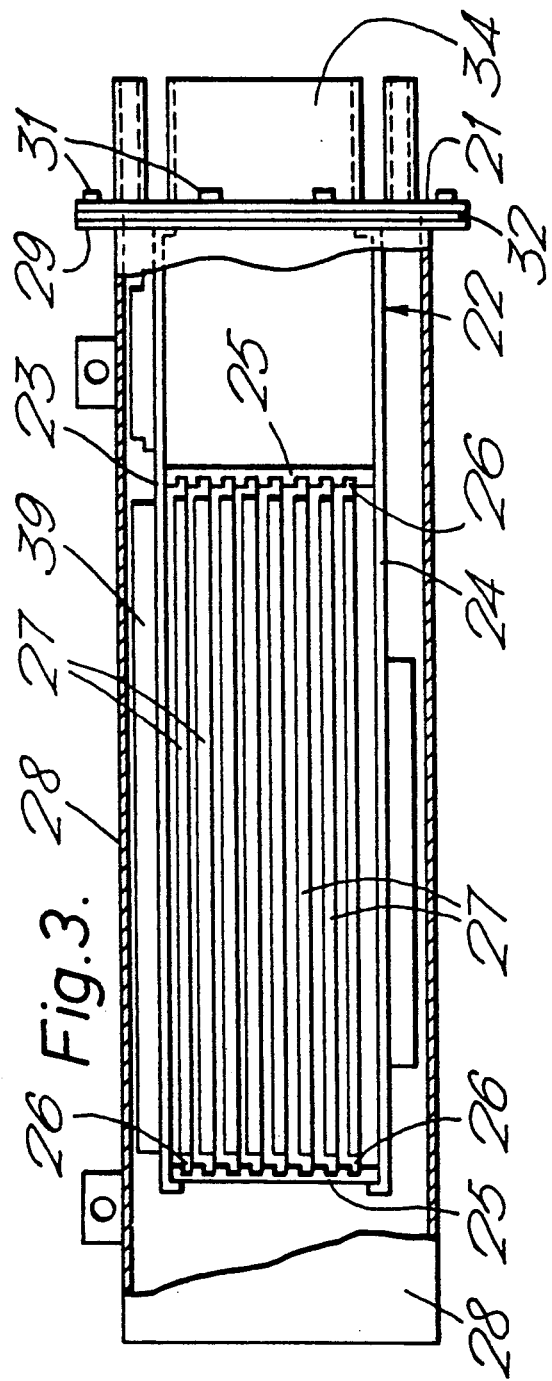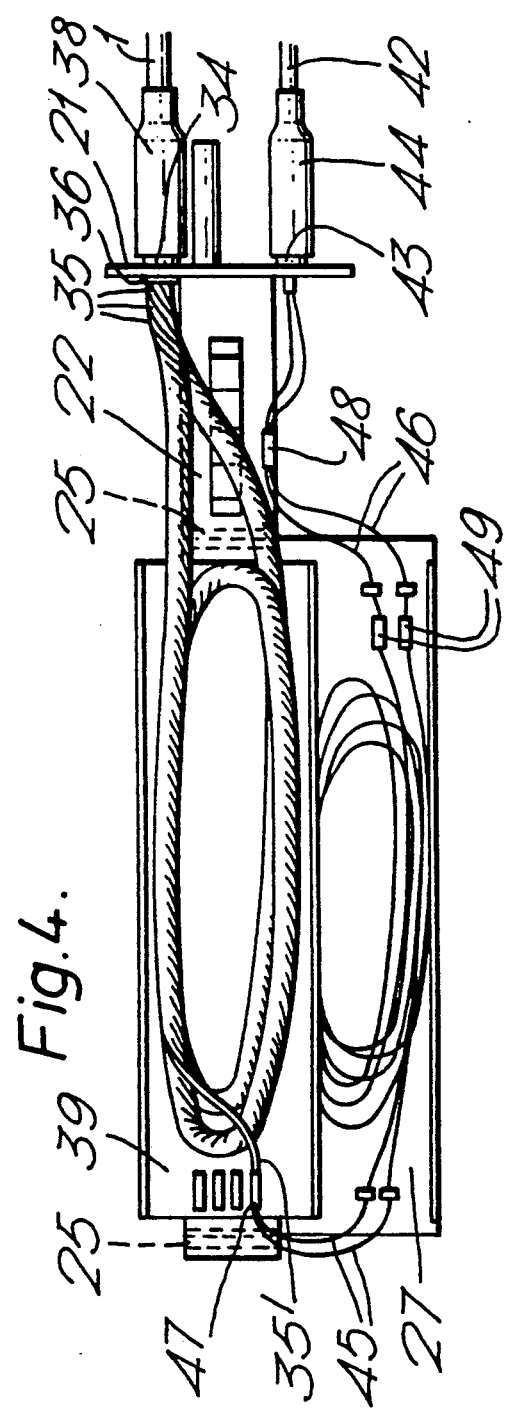

OPTICAL COMMUNICATION SYSTEM

This is a continuation, of application Ser. No. 07/109,237 filed Oct. 15, 1987 and now abandoned which, in turn, is a continatuion of application Ser. No. 06/786,327 filed Oct. 10, 1985, now abandoned.

BACKGROUND OF THE INVENTION

1. Field of the Invention

This invention relates to optical communication systems of the type comprising a main optical fibre cable having a plurality of optical fibres within a protective cover and in which the cable is required to be accessed by spur cables at spaced points along its length.

2. Description of Related Art

When such access points are known at the time of laying the main cable no problem arises since allowance can be made for the extra length of cable required for making the connections. However, if, at a future date, further connections are necessary, it could be found that the main cable does not have enough slack to allow the connections to be made.

SUMMARY OF THE INVENTION

Accordingly, the present invention provides an optical communication system incorporating a main optical fibre cable having a plurality of optical fibres within a protective cover, and at least one connection housing for allowing access to said cable intermediate its ends, the or each connection housing having an inlet and an outlet for the main cable, which is passed therethrough so as to provide an excess length of cable within the housing, and at least one access port which allows, in use, a spur cable to be passed into the housing and connected to the main cable.

Preferably there is a plurality of said connection housings provided at spaced intervals along the length of the cable.

Preferably also, the access port of the housing is normally closed off by a cover until it is required to connect a spur cable to the main cable, at which time the cover is removed to allow access to the interior of the housing.

Conveniently, the connection housing may already contain the fittings required to connect the fibres of the main cable to those of the spur cable, but alternatively, these may be positioned in the housing at the time of making the connections.

Such fittings may comprise means for allowing access to individual fibres in each of the main and spur cables as required, means for connecting the fibres of the main cable to those of the spur cable as required, and means for storing any excess length of fibre.

Preferably said excess length of cable provided within each housing is at least two meters and may be more so as to give sufficient length to allow several connections to be made if desired.

Preferably the connection housing incorporates a plurality of trays each arranged to accommodate excess lengths of optical fibres and each of which is movable in relation to the others to facilitate access to it. Thus the trays may be in the form of a stack of superposed drawers, each of which is withdrawable from the stack.

BRIEF DESCRIPTION OF THE DRAWINGS

Two embodiments of the invention will now be described by way of example with reference to FIGS. 1 to 4 of the accompanying drawings, in which FIGS. 2 and 3 represent a perspective view and a side view respectively of an alternative form of housing for use in such an optical communication system, and FIG. 4 represents a plan view of part of the housing.

DETAILED DESCRIPTION OF THE PREFERRED EMBODIMENTS

Figure 1:
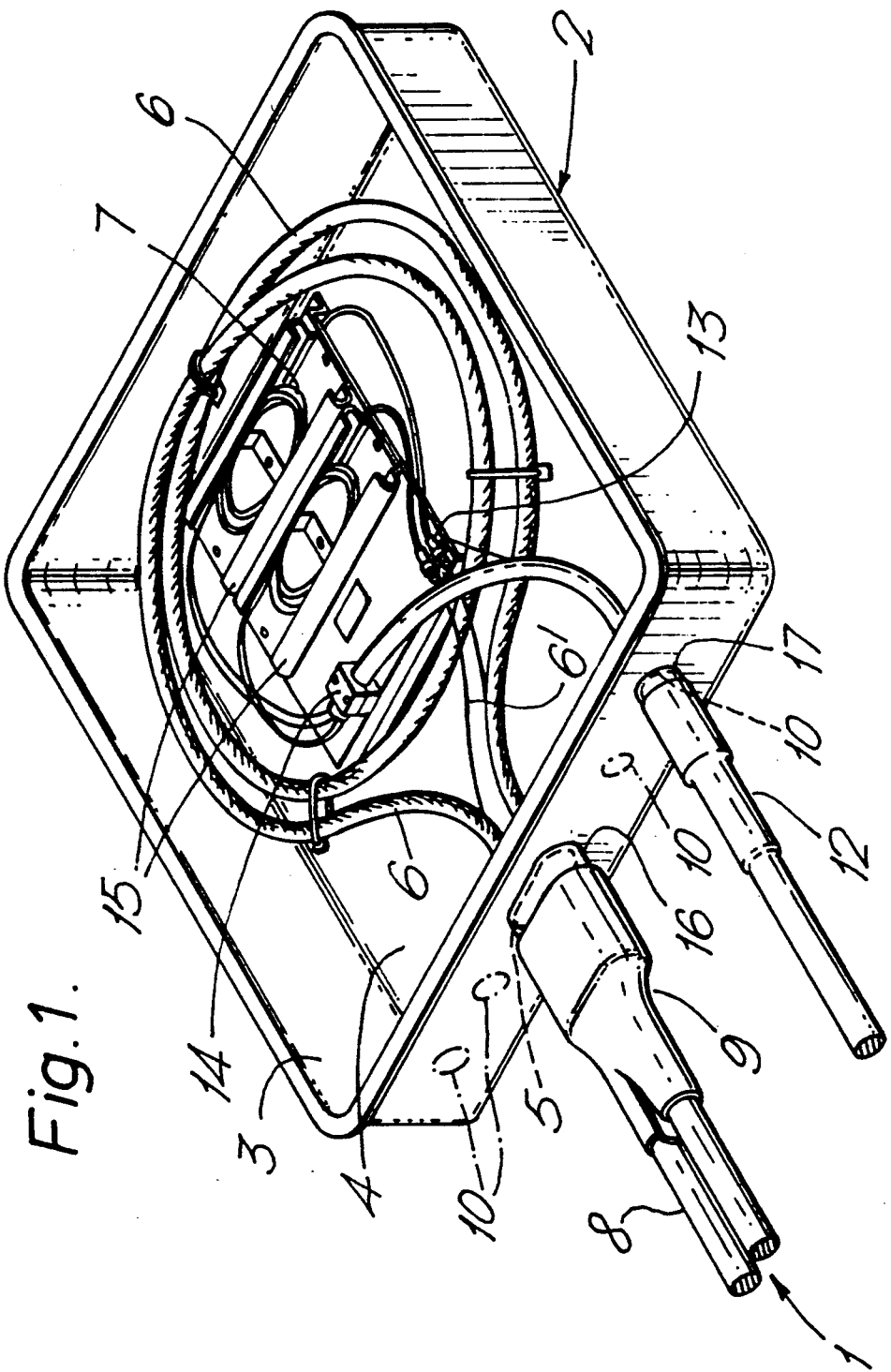
FIG. 1 illustrates a perspective view of part of one form of housing for use in an optical communication system in accordance with the invention.

Referring first to FIG. 1, in order to allow access to a main optical cable 1 which forms part of an optical communications system, several connection housings 2, one of which is shown in the drawings, are provided at spaced intervals along the length of the cable 1.

The connection housing 2, which comprises four walls 3, a base 4 and a removable lid (not shown), has an inlet/outlet cable port 5 in one of the walls 3 for the main cable 1, the cable port being fitted with a tubular projection, as at 16 through which the cable passes. In this embodiment, the cable 1 is of the type in which a plurality of tubes 6, e.g. sixteen, each containing several fibres 7, e.g. ten, are stranded together within a protective sheath 8. The entry and exit of the cable to and from the cable port 5 is kept free of contamination by covering the projection and adjacent part of the cable sheath with a heat-shrinkable sleeve 9 such as are well known in the art.

When the cable 1 enters the housing 2, it is looped round the housing several times to provide an excess length of cable, e.g. two meters, within the housing and is then led out again via the cable port 5, the part of the cable within the housing being stripped off the protective sheath 8 so as to expose the stranded tubes 6.

The housing is also provided with a number of access ports 10 in the walls 3, four being shown in the drawings. These access ports 10 are closed off by the wall of housing extending over them until such time as it is required to connect a spur cable 11 to the main cable 1, when the part of the wall closing off the access port is removed to allow the spur cable 11 to be passed into the housing 2 as is shown in the drawings for one of the access ports. The spur cable 11 may incorporate any number of fibres, e.g. between ten and eighty fibres, and may be of any desired construction.

Such a spur cable 11 is passed through a tubular projection 17 fitted to the access port 10 and the projection and adjacent part of the cable are covered by a heat-shrinkable sleeve 12 in a similar manner to that of the main cable 1 as described above, the end of the spur cable 11 within the housing being clamped by a clamp 14.

In order to make the connection between the fibres 7 from the main cable 1 and the spur cable 11, the requisite number of tubes 6 are unravelled from the main cable 1 as at 6' and are passed to manifolds 13. In the case of the embodiment as illustrated this is only done for one tube having up to ten optical fibres 7. At this point the tube 6' is broken into, allowing the optical fibres 7, only some of which are shown, to be passed through the manifold 13, to a respective organizer tray 15 as shown, where the fibres are joined to the fibres of the spur cable which have similarly been passed from the clamp 14 via a manifold (not shown) to the organizer tray 15.

Any fibres not connected at this time are stored in the organizer tray and may be connected at a later date if desired.

As will be appreciated, further cable connections are also possible at later times due to the other access ports provided and a system according to the invention thus provides means whereby many connections may be made to a cable after it has been laid.

Figure 2:
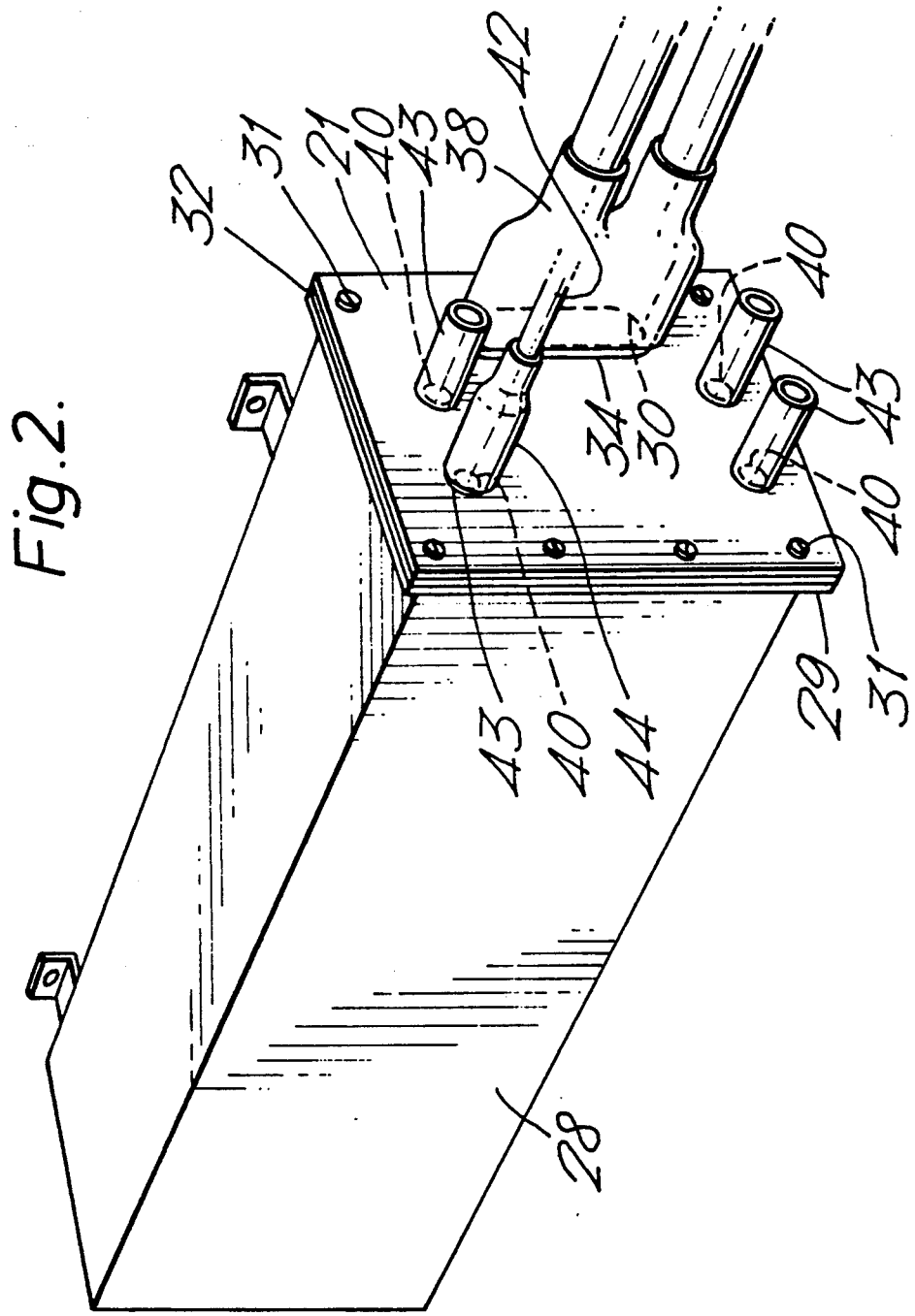

An alternative form of housing for use in a communication system in accordance with the invention is illustrated in FIGS. 2 to 4.

The housing incorporates an inner unit comprising a frame 22 having upper and lower plates 23, 24 fixed to an end plate 21, and supporting between them two spaced tray supports 25 which are provided on their inner surfaces with a plurality of horizontally-extending grooves 26. Each corresponding pair grooves supports between them a respective organizer tray 27 which can be slid out sideways from the stack of trays as shown in FIG. 4.

The frame/organizer tray assembly is arranged to be accommodated in a rectangular metal enclosure 28 (FIGS. 2 and 3). The enclosure has one open end and the frame/organizer tray assembly is introduced into the enclosure by sliding it in from the open end. The enclosure is provided, around the open end with an outwardly directed flange 29 to which the end plate 21 of the inner unit is arranged to be secured, as by screws 31, a gasket between the end plate and the flanges providing a moisture-proof seal.

The end plate 21 of the inner unit has a cable port 30 for the main cable 1 in the form of an elongate opening surrounded on the external face of the plate with a tubular protection 34 of a corresponding cross-section. The cable, as in the first embodiment, also consists of a plurality of tubes 35 stranded together in a protective sheath 36 and each accommodating several optical fibres.

Within the enclosure 28 the cable 1, stripped of its protective sheath 36 so as to expose the stranded tubes 35, is looped around a tray 39 fixed to the top of the upper frame plate 23, as shown in FIG. 4, to provide an excess length of cable for forming connections to one or more spur cables as will subsequently be described. The cable then passes out of the enclosure through the same cable port.

To prevent the entry of moisture into the enclosure 28 the projection 34 and the adjacent parts of the cable sheath 36 are covered by a heat-shrinkable sleeve 38.

The end plate 21 is also provided with a number of access ports 40, for example four as shown in FIG. 2, by which spur cables, as required, may enter the enclosure 28, each access port 40 being surrounded on the outside of the end plate 21 by a tubular projection 43, and where a spur cable, as at 42, enters the enclosure the respective projection and adjacent part of the cable are enclosed by a heat-shrinkable sleeve 44. The projections 43 of those access ports 40 which are not used are enclosed by a close-ended heat-shrinkable sleeve (not shown).

In order to make a connection between fibres 45 from the main cable 1 and fibres 46 from a spur cable 42, the inner unit incorporating the frame/organizer tray assembly is first withdrawn from the enclosure 28. The requisite number of tubes 35 (only one of which is shown at 35') are unravelled from the unsheathed part of the main cable 1 and passed to a manifold 47. The tubes are then broken into and fibres 45 from them led from the manifold to one or more of the organizer trays 27. Fibres 46 from the spur cable 42 are similarly passed to the respective organizer trays via a manifold shown at 48. Connections are made between the fibres 45 of the main cable 1 and the spur cable fibres 46 by means of any suitable form of connector, shown diagrammatically at 49 in FIG. 4.

Any excess lengths of fibres, and those fibres not employed, are looped several times around the respective organizer trays, and the fibres not connected at this time may be connected at a later date if required. The excess length of cable and fibres facilitates the making of the connections as and when desired, and as in the first embodiment the housing provides means enabling many connections to be made to a cable after the cable has been laid.

We claim:

1. A method of accessing a main, multiple optical fiber, sheathed, communications cable at selected field points along its length with a spur, optical fiber cable after the main sheathed cable has been laid in the field, comprising the steps of:
   (a) installing a weather-resistant connection housing at one of the field points, said housing having a main inlet, a main outlet and walls bounding a housing interior in communication with the main inlet and the main outlet;
   (b) routing the main sheathed cable through the main inlet into the housing interior, and forming an excess length of the main sheathed cable into at least one circumferentially-complete loop accommodated within the housing interior prior to routing the main sheathed cable out of the housing through the main outlet;
   (c) forming at least one access port through which the spur cable enters the housing interior; and
   (d) connecting at least one optical fiber of the main cable loop to one optical fiber of the spur cable while leaving the remaining optical fibers of the main cable undisturbed, said remaining optical fibers of the main cable extending continuously and uninterruptedly from the main inlet, around the loop and to the main outlet and remaining operational to convey communications along the main cable during the connection of said one optical fibers of the main and spur cables.

2. The method according to claim 1, and further comprising the step of weatherproofing the main inlet, the main outlet and the one access port.

3. The method according to claim 1, wherein said step of forming an excess length of the main cable within the housing interior is performed by measuring the excess length to be at least about two meters.

4. The method according to claim 1, and further comprising the step of storing the loop of the main cable on a movable support mounted within the housing.

5. The method according to claim 4, wherein the storing step is performed by supporting excess lengths of individual optical fibers from the loop of the main cable on individually movable trays, each tray being independently movable of the other trays.

6. The method according to claim 5, wherein the storing step includes arranging the trays in a stack of superimposed drawers, each independently withdrawable from the stack.

7. The method according to claim 5, wherein the storing step includes providing each tray with a connector fitting.

8. A system for accessing a main, multiple optical fiber, sheathed, communications cable at selected field points along its length with a spur, optical fiber cable after the main sheathed cable has been laid in the field, said system comprising:
(a) a weather-resistant connection housing at one of the field points, said housing having a main inlet, a main outlet and walls bounding a housing interior in communication with the main inlet and the main outlet;
(b) means for routing the main sheathed cable through the main inlet into the housing interior, and forming an excess length of the main sheathed cable into at least one circumferentially-complete loop accommodated within the housing interior prior to routing the main sheathed cable out of the housing through the main outlet;
(c) means for storing the loop of the main cable on a movable support mounted within the housing, excess lengths of individual optical fibers from the loop of the main cable being supported on individually movable trays, each tray being independently movable of the other trays, the trays being arranged in a stack of superimposed drawers, each independently withdrawable from the stack;
(d) means for forming at least one access port through which the spur cable enters the housing interior; and
(e) means for connecting at least one optical fiber of the main cable loop to one optical fiber of the spur cable while leaving the remaining optical fibers of the main cable undisturbed, said remaining optical fibers of the main cable extending continuously and uninterruptedly from the main inlet, around the loop and to the main outlet and remaining operational to convey communications along the main cable during the connection of said one optical fibers of the main and spur cables.

9. The system according to claim 8, and further comprising means for weatherproofing the main inlet, the main outlet and the one access port.

10. The system according to claim 8, wherein said excess length of the main cable within the housing interior measures at least about two meters.

11. The system according to claim 8, wherein each tray has a connector fitting.

* * * * *